Patented Mar. 1, 1927.

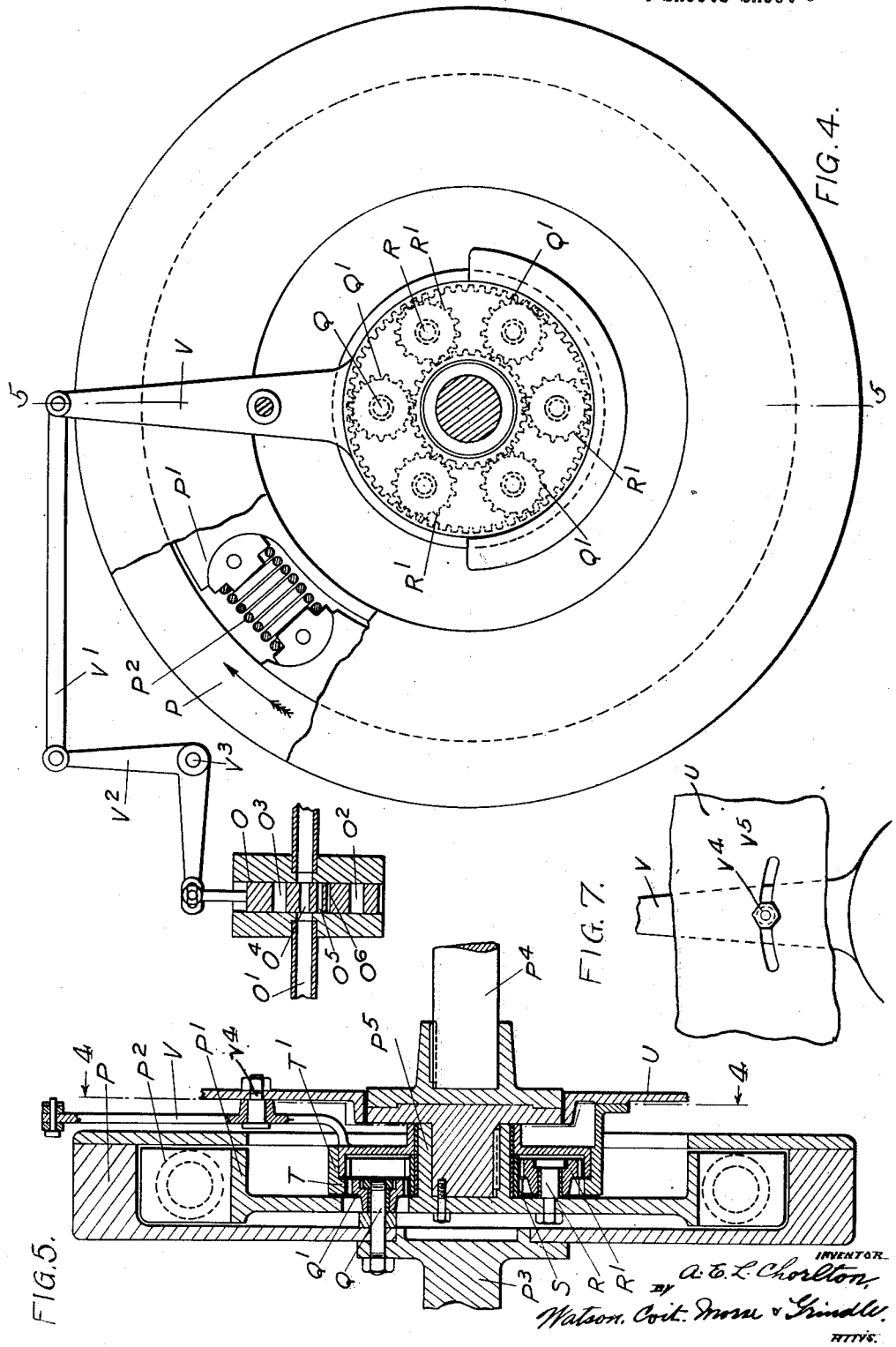

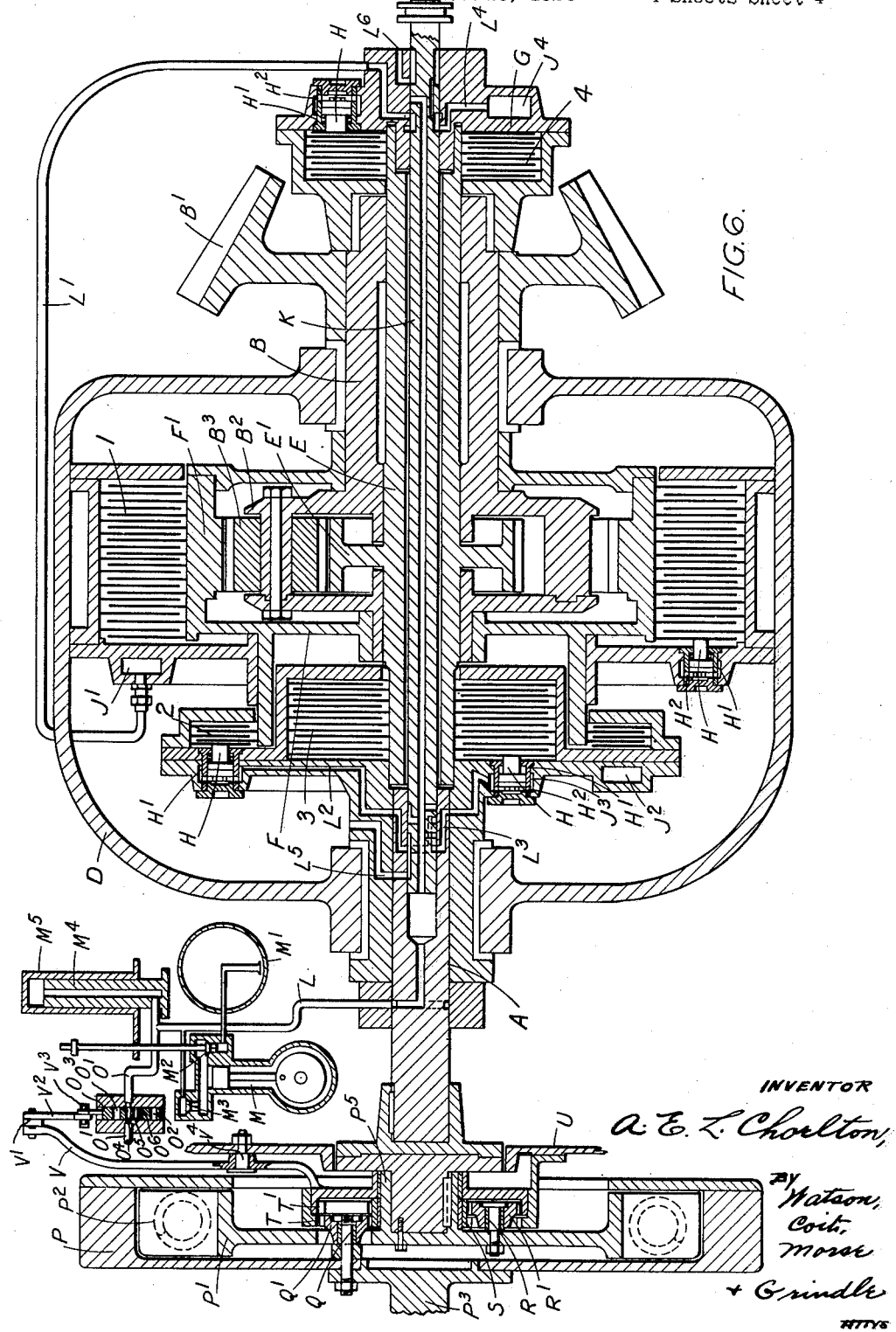

1,619,703

UNITED STATES PATENT OFFICE.

ALAN ERNEST LEOFRIC CHORLTON, OF LONDON, ENGLAND.

POWER-TRANSMISSION MECHANISM.

Application filed November 28, 1924. Serial No. 752,748.

This invention relates to mechanical power transmission systems and has for its primary object to protect such a system from undue stresses due for example to overloads or sudden shocks.

Although generally applicable to mechanisms in which power is transmitted from a prime mover to a variable load, the invention is more especially intended for use on an internal combustion engine locomotive for the purpose of preventing stalling or straining of the engine.

According to this invention a torque limiting device is connected to one member of the transmission mechanism in such a manner as to be operated by variations in the torque transmitted through this member, the device acting to control a variable driving connection in the transmission system, as for example by effecting the disengagement of a clutch mechanism when the torque exceeds a predetermined limit.

Thus the invention may be applied to a transmission system which includes an epicyclic variable speed gear of the kind described in the present applicant's prior United States of America patent application Serial No. 724,719 in which the speed changes are brought about by means of slipping clutches of the plate type preferably controlled selectively by a fluid pressure system. In this case the torque limiting device may act to control the fluid pressure in the system and thus also the operation of the plate clutches.

A further object of the invention is to provide a convenient mechanical construction for a torque limiting device, which is operative in accordance with torque variations, preferably irrespective of the speed of the member to which the device is connected.

Another object of the invention is to provide means for progressively varying the effect of the torque limiting device in accordance with torque variations.

A further object is to prevent damage occuring when a reversal of the torque takes place and the driven member of the system drives the driving member.

Still further objects of the invention will be apparent from the following description of the accompanying drawings. These drawings illustrate by way of example two alternative methods of carrying out the invention, more particularly in its application to a transmisison mechanism in an internal combustion engine locomotive employing an epicylic gear of the kind described in the abovementioned prior application.

In these drawings—

Figure 4 is an end view of an alternative construction of torque limiting device taken principally on line 4—4 of Fig. 5, Figure 5 is a section on the line 5—5 of Figure 4, and Fig. 6 shows the alternative construction of Figs. 4 and 5 in association with a variable speed gear; and Fig. 7 is an elevation of a portion of Fig. 5.

Figure 1:
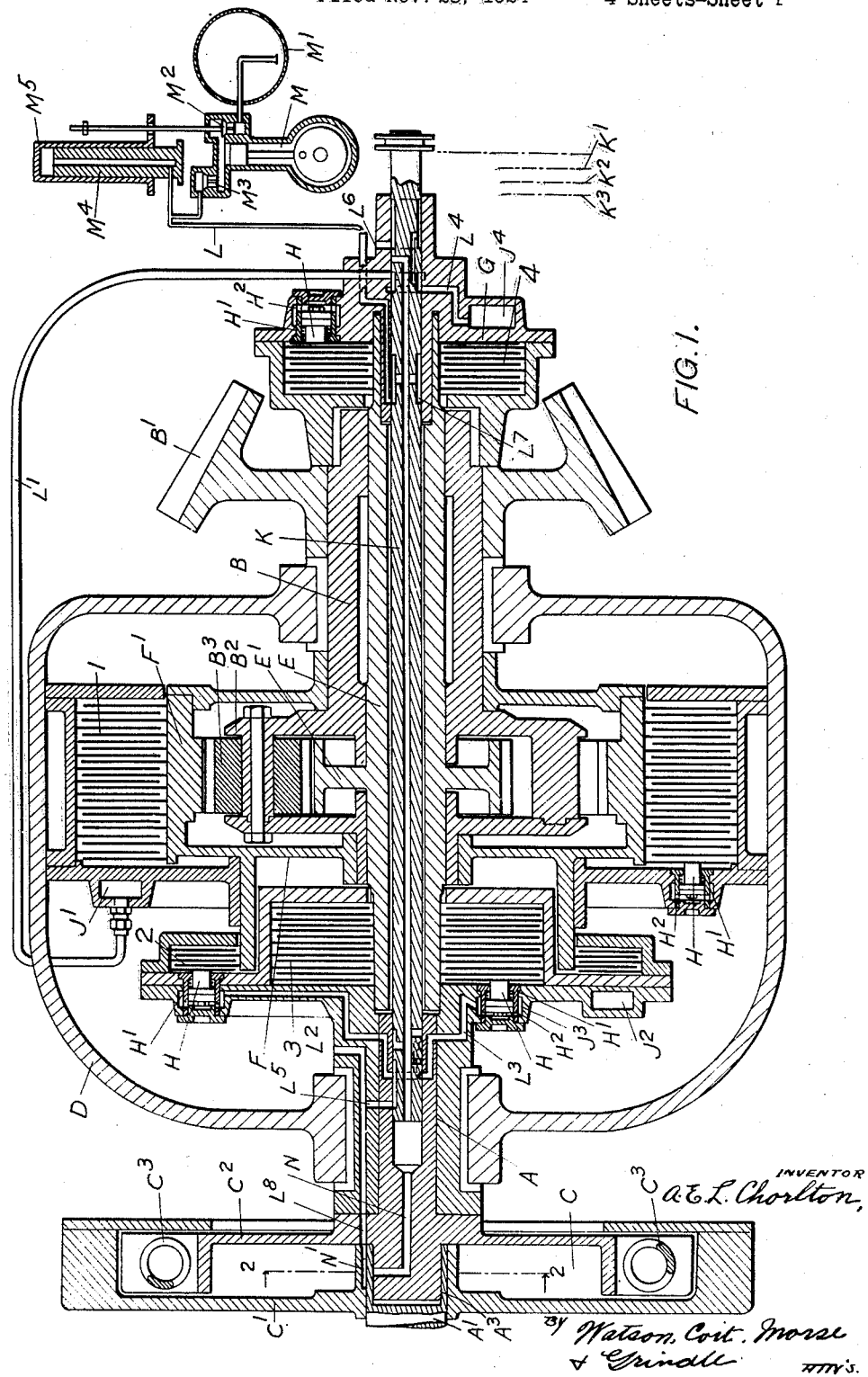
Figure 1 is a longitudinal section showing one form of torque limiting device together with a convenient construction of epicyclic variable speed gear.

In the construction illustrated in Figure 1 the variable speed gear comprises a driving member A and a driven member B, the driving member A being connected to a driving shaft A' by means of a torque limiting device C. The members A and B are supported in bearings in a frame D and the member B carries at one end a bevel pinion B' while its other end is connected to a member B² on which are mounted the planet pinions B³ of the epicyclic gear. Rotatably mounted within the members A and B is a hollow sleeve E carrying the sun pinion E' of the epicyclic gear, and rotatably mounted outside the member B is a member F carrying the toothed annulus F' of the epicyclic gear. Four plate clutches are provided, a clutch 1 adapted to connect the annulus F' to the frame D and thus hold the annulus stationary, a clutch 2 adapted to connect the driving member A to the member F carrying the annulus F', a clutch 3 adapted to connect the driving member A to the sleeve E carrying the sun pinion E' and a clutch 4 adapted to connect the sleeve E carrying the sun pinion E' to a stationary part G of the mechanism. Each of the clutches 1, 2, 3 and 4 is adapted to be controlled by a series of plunger devices H arranged in the end of the clutch casing. Each of these plunger devices is formed as a piston working within a cylinder H' adapted to press on the end clutch plate so as to cause the engagement of the clutch. The cylinder H′ has openings H² in it which communicate with a fluid chamber in the clutch casing. The four fluid chambers for the clutches 1, 2, 3 and 4 are respectively shown at J′, J², J³ and J⁴.

The driving member A and the stationary member G each have a hollow bore within which is mounted to slide a valve member K, this valve member passing through the interior of the member E and being adapted to control the flow of fluid through passages L′, L², L³, and L⁴ leading respectively to the chambers J′, J², J³ and J⁴ and also the flow of fluid from these chambers to relief passages L⁵, L⁶ formed respectively in the members A and B. The valve member K is hollow and fluid under pressure is constantly fed to the interior thereof through a passage L communicating at one end through an annular recess L⁷ with the interior of the member K and at the other end with a source of fluid pressure, the flow of fluid to and from the various passages L′, L², L³ and L⁴ being adapted to take place respectively through ports and recesses in the wall of the valve member K. The fluid is supplied from a reservoir M′ through an inlet valve M² to a pump M and is delivered therefrom through a delivery valve M³ to the passage L. A pressure regulating device is provided comprising a fixed piston M⁴ and a movable cylinder M⁵ fitting over it, the fluid being admitted to the cylinder through an internal passage in the piston. Means are provided whereby when the cylinder is raised beyond a predetermined limit the inlet valve M² of the pump M is opened to prevent further delivery from the pump until the pressure has fallen sufficiently to enable the valve M² again to close.

The ports and recesses in the valve member K are so shaped and disposed that when the valve is in the position shown all the passages L′, L², L³ and L⁴ are in communication with the relief passages L⁵ and L⁶ so that all the clutches are disengaged and the gear is thus in its neutral position. When the valve member K is moved to the position K′ the passages L² and L⁴ remain in communication with the relief passages while the passages L′ and L³ are cut off from relief and are placed in communication with the interior of the valve member K so that fluid under pressure passes to these passages and thus causes the engagement of the clutches 1 and 3. This brings the first and lowest gear into operation, in which the driving member A is clutched to the sun pinion E′ and drives the member B through the planet pinions, the annulus F′ being held stationary. When the valve member K is moved into the position K² the passages L′ and L³ are opened to the relief passages so as to disengage the clutches 1 and 3 while the passages L² and L⁴ are brought into communication with the interior of the valve member, thus supplying fluid under pressure to bring about the engagement of the clutches 2 and 4. In this position the second gear comes into operation, in which the driving member A is clutched to the toothed annulus F′ and drives the member B through the planet pinions B³, the sun pinion E′ being held stationary. In the position K³ the passages L′ and L⁴ are opened to the relief passages while the passages L² and L³ are brought into communication with the interior of the valve member K so that the clutches 1 and 4 are disengaged and the clutches 2 and 3 are engaged. In this position a direct drive is effected, the sun pinion E′ and the annulus F′ both being connected directly to the driving member A.

It will be seen that, as long as sufficient fluid pressure exists within the member K, those clutches to which pressure is supplied in accordance with the position of this member are held in close engagement, the remaining clutches being disengaged. The torque limiting device C is however adapted to open a relief passage N and thus relieve the fluid pressure within the member K so as to bring about the disengagement of all the clutches, if and when the torque transmitted through the driving member A exceeds a predetermined limit and preferably also if the member B tends to drive the member A and the reverse torque thus produced exceeds a predetermined limit.

The torque limiting device C comprises two coaxial wheels C′ C² which are mounted respectively on the driving shaft A′ and the driving member A and are connected together by a series of springs C³. The actual arrangement of the springs C³ is similar to that shown in the alternative construction illustrated in Figures 4 and 5 to be described later. It will be seen that with this arrangement variations in the torque transmitted through the member C will cause relative rotation between the wheels C′ and C². The driving shaft A′ which is connected to the wheel C′ of the device C is provided with an annular extension A³ which is in the form of a ported sleeve arranged as shown in section in Figure 2 or in Figure 3 so as to establish communication under certain conditions between the passage N and a recess N′ in the hub of the wheel C′. The recess N′ is in constant communication with a passage L⁸ leading into the relief passage L⁵.

Figure 2:
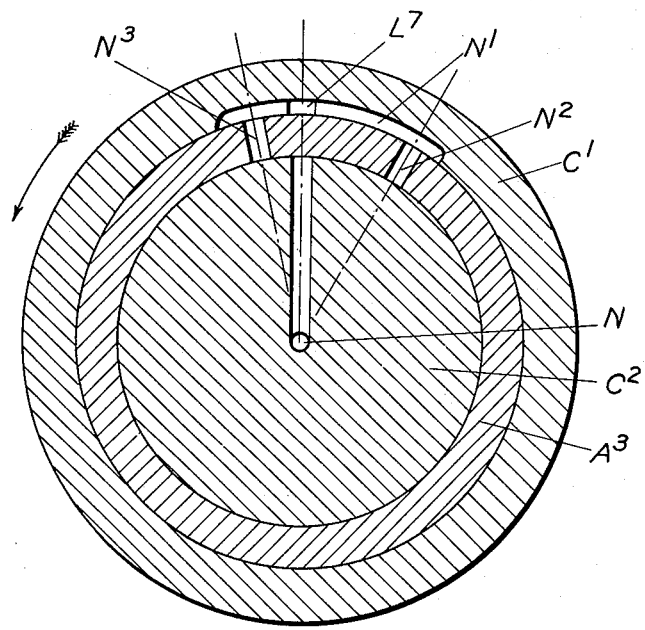
Figures 2 and 3 are cross-sections on an enlarged scale on the line 2—2 of Figure 1 and show two alternative arrangements of relief passages.

In the arrangement shown in Figure 2 in which the parts are shown in their no-torque position, the sleeve A³ is provided with two ports N² and N³, the direction of rotation being indicated by the arrow. An increase in torque causes the wheel C′ to move relatively to the wheel C² in the direction of the arrow, and if the torque increases beyond a predetermined maximum, the relative movement between these two members is such that the passage N comes into communication with the port N'. This relieves the pressure in the interior of the valve member K and causes the disengagement of any of the gear clutches which are in engagement at the time. Similarly, if the torque is reversed due to the member A tending to drive the shaft A', the wheel $C^2$ overruns the wheel C', and if this reverse torque exceeds a predetermined limit, this relative movement is sufficient to bring the passage N into communication with the port $N^3$ and thus again relieves the pressure and causes the disengagement of the clutches. It will be seen that, with this arrangement, if either the ordinary driving torque or the reverse torque exceeds a predetermined limit, relief of the fluid pressure and hence disengagement of the clutches is effected.

Figure 3:
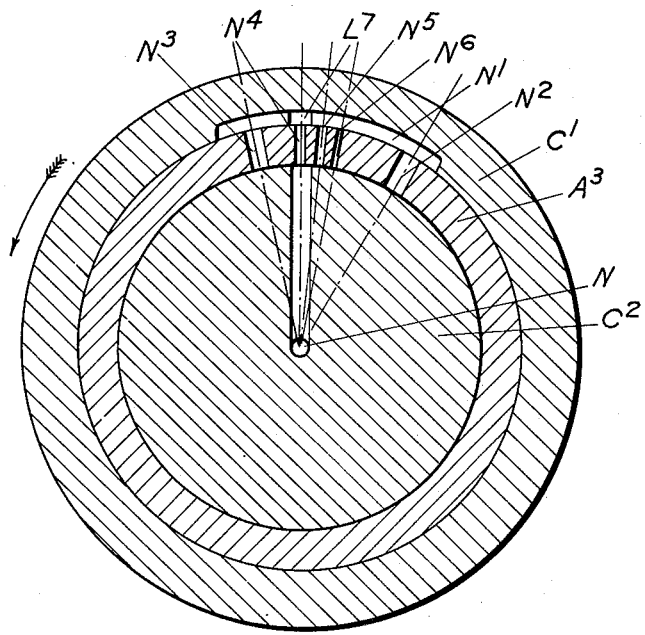

The construction shown in Figure 3 is similar to that shown in Figure 2 except that, in addition to the ports $N^2$ and $N^3$, further ports $N^4$, $N^5$ and $N^6$ are provided in the sleeve $A^3$ so as to register with the passage N at various relative positions of the wheels C' and $C^2$. The port $N^4$ is adapted to register with the passage N when the wheels C' and $C^2$ are in their no-torque position, this port being of such cross section that it permits only a partial relief of the fluid pressure. Thus, when the valve member K is moved to a gear position, a certain amount of fluid pressure is admitted to the operating mechanism of the clutches in question, this fluid pressure being sufficient to cause a partial engagement of such clutches a certain amount of slipping being allowed to occur between the separate plates of the clutches. This partial engagement allows a relatively small mount of torque to be transmitted through the device C and this torque in turn causes a small amount of relative rotation between the wheels C' and $C^2$ sufficient to bring the passage N into communication with the port $N^5$. The port $N^5$ is of smaller cross section than the port $N^4$ so that the amount of fluid relief is reduced and the clutches are engaged somewhat more tightly. This further engagement allows still further torque to be transmitted through the device C and the consequent further relative rotation brings the passage N into communication with the port $N^6$ which is still more restricted than the port $N^5$. The degree of engagement of the plates of the clutch is thus still further increased with a corresponding increase in the torque transmitted through the device C, until finally the passage N moves out of engagement with the port $N^6$ and the clutches are subjected to the full fluid pressure. It will be seen that, with this arrangement the gradual progressive engagement of the clutches is ensured and further the disengagement of the clutches is effected if either the ordinary driving torque or the reverse torque exceeds a predetermined limit as in the construction illustrated in Figure 2. It is to be understood that any number of ports such as $N^4$, $N^5$, $N^6$ may be employed as desired.

It will be seen that in this construction the torque limiting device directly controls the fluid passages controlling the clutches of the gear and that the device must therefore be disposed adjacent to the gear. In some cases however it is inconvenient to mount the device next to the gear itself and Figures 4 and 5 show an alternative construction of the device which can be disposed at any convenient point in the transmission system either on the driving side or on the driven side of the gear. In this case the device controls a relief valve O controlling a relief passage O' which is connected to a convenient point in the fluid pressure system controlling the gear, as for example to the main supply passage (indicated at L in Figure 1).

In the construction shown in Figures 4 and 5 the device comprises two coaxial wheels P P' which are connected together by springs $P^2$ and are mounted respectively on the two parts $P^3$ $P^4$ of a shaft forming part of the transmission system, the part $P^3$ being on the driving side. Mounted on spindles Q journalled on the wheel P are a set of planet pinions Q', whilst the member P' carries a similar set of spindles R on which are mounted planet pinions R'. Both these sets of planet pinions mesh with a common sun pinion S mounted to rotate freely on a boss $P^5$ on the shaft $P^4$. A toothed annulus T meshes with the pinions Q' and is carried by a fixed bracket U. A second toothed annulus T' meshes with the pinions R' and is carried by an arm V connected at its outer end by means of a link V' to one arm of a lever $V^2$ pivoted at $V^3$, the other arm of this lever $V^2$ acting on the valve O. The arm V carries a pin $V^4$ which passes through an arcuate slot in the fixed bracket U. In this construction it will be seen that relative rotation between the wheels P and P' due to variations in the torque transmitted through the shaft $P^3$ $P^4$ will cause the annulus T' to move relative to the stationary annulus T and thus to move the arm V so as to operate the valve O. The valve O is preferably provided with a series of relief ports $O^2$, $O^3$, $O^4$, $O^5$ and $O^6$, which correspond to the ports $N^2$, $N^3$, $N^4$, $N^5$ and $N^6$ in the construction illustrated in Figure 3. Thus the pressure will be relieved to a progressively decreasing extent as the wheels P P' begin to move relatively from the zero position, until the normal running position is reached when the ports $O^4$, $O^5$, $O^6$ will have moved past the passage O' and this passage will be closed. In the event of an increase in torque beyond the predetermined limit the port O² will open the passage O' and completely relieve the pressure in the system. Similarly, if a reversal of the torque takes place and there is a tendency for the shaft P⁴ to drive the shaft P³, the pressure will be relieved through the port O³ when the reverse torque exceeds a predetermined limit.

Figure 6 shows the manner in which the torque-responsive device of Figures 4 and 5 can be used to control the supply of pressure fluid to a variable speed gear of the kind shown in Figure 1. In this figure the gear is identical with that shown in Figure 1 and the same reference letters are employed, the fluid supply apparatus M ... M⁵ being shown on the left-hand side of the gear for convenience. The torque-responsive device in Figure 6 is identical with that shown in Figure 5 and the same reference letters are employed, the valve O ... O⁶ (shown in Figure 4) being included on a smaller scale. The relief passage O¹ controlled by this valve is connected to the main fluid supply passage L.

What I claim as my invention and desire to secure by Letters Patent is:—

1. In a power transmission mechanism the combination of a driving member, a driven member, a variable driving connection between these two members, a fluid pressure system for controlling the variable driving connection, a device connected to one of the members comprising two flexibly connected parts between which relative movement is produced by variations in the torque transmitted through the member to which the device is connected irrespective of the speed of such member, and means whereby such relative movement acts on the fluid pressure system and thereby controls the variable driving connection.

2. In a power transmission mechanism the combination of a driving member, a driven member, a clutch mechanism adapted when engaged to bring into effect a driving connection between these two members, a fluid pressure system for effecting the engagement and disengagement of the clutch mechanism, a device through which the power is transmitted comprising flexibly connected driving and driven parts so arranged that relative movement is produced between these two parts by variations in the torque transmitted through them irrespective of their speed, and means whereby such relative movement beyond a predetermined limit acts on the fluid pressure system so as to cause disengagement of the clutch mechanism.

3. In a power transmission mechanism the combination of a driving member, a driven member, a variable speed gear connecting these members, clutches for bringing the various gear ratios into operation, means for selectively engaging and disengaging these clutches, a device through which the power is transmitted comprising flexibly connected driving and driven parts so arranged that relative movement is produced between these two parts by variations in the torque transmitted through them irrespective of their speed, and means whereby such relative movement beyond a predetermined limit brings about the disengagement of all the clutches and therefore renders impossible transmission from the driving member to the driven member of torque greater than a predetermined maximum.

4. In a power transmission mechanism the combination of a driving member, a driven member, a variable speed gear connecting these members, clutches for bringing the various gear ratios into operation, a fluid pressure system for selectively controlling the clutches, a device connected to one of the members comprising two flexibly connected parts between which relative movement is produced by variations in the torque transmitted through the member to which the device is connected, and means whereby such relative movement beyond a predetermined limit acts on the fluid pressure system so as to cause the disengagement of at least one of the clutches.

5. In a power transmission mechanism the combination of a driving member, a driven member, an epicyclic variable speed gear connecting these members, plate clutches for bringing the various gear ratios into operation, a fluid pressure system for selectively controlling the plate clutches, a device through which the power is transmitted comprising two flexibly connected parts so arranged that relative movement is produced between these two parts by variations in the torque transmitted through them, and means whereby such relative movement beyond a predetermined limit acts to relieve the pressure in the fluid pressure system and thereby to release all the plate clutches.

6. In a power transmission mechanism the combination of a driving member, a driven member, one of these members being divided into two parts, a variable driving connection between the two members, a device forming an operative connection between the two parts of the divided member and comprising two coaxial wheels carried respectively by the two parts and a spring connection between the two wheels, differential mechanism operated in accordance with the relative movement between the two wheels, and means whereby the differential mechanism is caused to control the variable driving connection.

7. In a power transmission mechanism the combination of a driving member, a driven member, one of these members being divided into two parts, a clutch mechanism adapted when engaged to bring into effect a driving connection between the two members, a fluid pressure system for controlling the clutch mechanism, a device forming an operative connection between the two parts of the divided member and comprising two co-axial wheels carried respectively by the two parts and a resilient connection between the two wheels, differential mechanism operated in accordance with the relative movement between the two wheels, and means whereby such relative movement beyond a predetermined limit causes the differential mechanism to act on the fluid pressure system and thereby to disengage the clutch mechanism.

8. In a power transmission mechanism the combination of a driving member, a driven member, one of these members being divided into two parts, a variable speed gear interposed between the two members, clutches controlling the speed changes of the variable speed gear, a device forming an operative connection between the two parts of the divided member and comprising two coaxial wheels carried respectively by the two parts and a resilient connection between the two wheels, differential mechanism operated in accordance with the relative movement between these two wheels, and means whereby such relative movement beyond a predetermined limit causes the differential mechanism to disengage at least one of the clutches.

9. In a power transmission mechanism the combination of a driving member, a driven member, one of these members being divided into two parts, an epicyclic variable speed gear interposed between the two members, plate clutches controlling the speed changes of the variable speed gear, a fluid pressure system for selectively engaging and disengaging the plate clutches, a device forming an operative connection between the two parts of the divided member and comprising two coaxial wheels carried respectively by these two parts and a spring connection between the two wheels, differential mechanism operated in accordance with the relative movement between the two wheels, and means whereby such relative movement beyond a predetermined limit causes the differential mechanism to relieve the pressure in the fluid pressure system and thereby to release the plate clutches.

10. In a power transmission mechanism a driving member divided into two parts, a driven member, a variable driving connection between the two members, two coaxial wheels carried respectively by the two parts of the driving member, a resilient connection between the two wheels, two sets of planet pinions carried respectively by the two wheels, a common sun pinion with which all the planet pinions engage, two toothed annuli engaging respectively with the two sets of planet pinions one of the annuli being held stationary, and means whereby movement of the second annulus is caused to control the variable driving connection.

11. In a power transmission mechanism the combination of a driving shaft, a driven member, an intermediate shaft, a clutch mechanism interposed between the intermediate shaft and the driven member, a fluid pressure system for controlling the clutch mechanism, two coaxial wheels carried respectively by the driving shaft and the intermediate shaft, a resilient connection between the two wheels, two sets of planet pinions carried respectively by the two wheels, a common sun pinion with which all the planet pinions engage, two toothed annuli engaging respectively with the two sets of planet pinions one of the annuli being held stationary, and means whereby movement of the second annulus is caused to act on the fluid pressure system and thereby to disengage the clutch mechanism.

12. In a power transmission mechanism, the combination of a driving member, a driven member, a variable driving connection between these members, fluid pressure operated mechanism for controlling the variable driving connection, means for delivering fluid under pressure to this mechanism, a relief valve controlling the pressure of the fluid delivered and having a plurality of alternative relief passages so arranged that the pressure will be relieved to an extent dependent upon the travel of the valve, a device connected to one of the members comprising two flexibly connected parts between which relative movement is produced by variations in the torque transmitted through the member to which the device is connected, and means whereby such relative movement is caused to operate the relief valve.

13. In a power transmission mechanism a driving member, a driven member, an epicyclic variable speed gear interposed between these members, plate clutches for bringing the various gear ratios into operation, fluid pressure operated mechanism for selectively controlling the plate clutches, means for delivering fluid under pressure to this mechanism, a relief valve controlling the pressure of the fluid delivered and having a plurality of relief passages so arranged that the pressure will be relieved to an extent dependent upon the travel of the valve, a device connected to one of the members of the transmission mechanism comprising two flexibly connected parts between which relative movement is produced by variations in the torque transmitted through the member to which the device is connected, and means whereby such relative movement is caused to operate the relief valve in such a manner as to relieve the pressure to a varying extent as the torque increases and thereby to allow a varying amount of slipping to occur between the separate plates of the clutches.

14. In a power transmission mechanism the combination of a driving member, a driven member, a variable driving connection between these two members, a device connected to one of the members comprising two parts between which relative movement is produced by variations in the torque transmitted through the member to which the device is connected, means whereby such relative movement is caused to control the variable driving connection and means for disconnecting the driven member from the driving member if a reversal of the torque takes place and the driven member tends to drive the driving member whereby the transmission of torque greater than a predetermined maximum from the driven member to the driving member is rendered impossible.

15. In a power transmission mechanism the combination of a driving member, a driven member, clutch mechanism adapted when engaged to bring into effect a driving connection between these two members, a device connected to one of the members comprising two flexibly connected parts relatively movement between which is produced by variations in the torque transmitted through the member to which the device is connected irrespective of the speed of this member, and means whereby such relative movement beyond a predetermined limit in either direction brings about the disengagement of the clutch mechanism and thereby renders impossible the transmission of torque greater than a predetermined maximum from one of the members to the other.

16. In a power transmission mechanism the combination of a driving member, a driven member, a clutch mechanism adapted when engaged to bring into effect a driving connection between these two members, a fluid pressure system for effecting the engagement and disengagement of the clutch mechanism, a device through which the power is transmitted comprising flexibly connected driving and driven parts so arranged that relative movement is produced between these two parts by variations in the torque transmitted through them irrespective of their speed, means whereby such relative movement beyond a predetermined limit acts on the fluid pressure system so as to cause disengagement of the clutch mechanism, and means for disengaging the clutch mechanism if a reversal of the torque takes place and the driven member tends to drive the driving member.

17. In a power transmission mechanism the combination of a driving member, a driven member, a variable speed gear connecting these members, clutches for bringing the various gear ratios into operation, a fluid pressure system for selectively controlling the clutches, a device connected to one of the members comprising two flexibly connected parts between which relative movement is produced by variations in the torque transmitted through the member to which the device is connected, and means whereby such relative movement beyond a predetermined limit in either direction acts on the fluid pressure system so as to cause the disengagement of at least one of the clutches.

18. In a power transmission mechanism a driving member, a driven member, an epicyclic variable speed gear interposed between these members, plate clutches for bringing the various gear ratios into operation, fluid pressure operated mechanism for selectively controlling the plate clutches, means for delivering fluid under pressure to this mechanism, a relief valve controlling the pressure of the fluid delivered and having a plurality of relief passages so arranged that the pressure will be relieved to an extent dependent upon the travel of the valve, a device connected to one of the members of the transmission mechanism comprising two flexibly connected parts between which relative movement is produced by variations in the torque transmitted through the member to which the device is connected, and means whereby such relative movement is caused to operate the relief valve in such a manner as to relieve the pressure to a varying extent as the torque increases and thereby to allow a varying amount of slipping to occur between the separate plates of the clutches and also to relieve the pressure completely and thereby to bring about the disengagement of all the clutches when the relative movement exceeds a predetermined limit in either direction.

In testimony whereof I have signed my name to this specification.

ALAN ERNEST LEOFRIC CHORLTON.